US012661820B2

(12) United States Patent
Kashiba

(10) Patent No.: US 12,661,820 B2
(45) Date of Patent: Jun. 23, 2026

(54) CUTTING APPARATUS

(71) Applicant: Horizon Inc., Takashima (JP)

(72) Inventor: Masayuki Kashiba, Takashima (JP)

(73) Assignee: Horizon Inc., Takashima (JP)

( * ) Notice: Subject to any disclaimer, the term of this patent is extended or adjusted under 35 U.S.C. 154(b) by 74 days.

(21) Appl. No.: 18/822,882

(22) Filed: Sep. 3, 2024

(65) Prior Publication Data

US 2025/0073943 A1 Mar. 6, 2025

(30) Foreign Application Priority Data

Sep. 5, 2023 (JP) ................................ 2023-143421

(51) Int. Cl.
*B26D 7/26* (2006.01)
*B26D 1/08* (2006.01)

(52) U.S. Cl.
CPC ............ *B26D 7/2628* (2013.01); *B26D 1/08* (2013.01); *B26D 7/2614* (2013.01)

(58) Field of Classification Search
CPC ...... B26D 7/2628; B26D 1/08; B26D 7/2614; B26D 7/025; B23D 35/005; B23D 15/04; B23D 35/002; G01B 21/16; G01B 15/02; Y10T 83/8831; Y10T 83/9447; Y10T 83/883; Y10T 83/8868; Y10T 83/955; Y10T 83/5778; Y10T 83/9483
USPC .... 83/563, 397, 614, 619, 620, 641, 694, 69
See application file for complete search history.

(56) References Cited

U.S. PATENT DOCUMENTS

| | | | | | |
|---|---|---|---|---|---|
| 2,525,401 | A * | 10/1950 | Dehn | B23D 35/002 | 83/612 |
| 2,734,572 | A * | 2/1956 | Pater | B23D 35/005 | 29/6.1 |
| 3,227,020 | A * | 1/1966 | Zeytoonian | G01N 1/06 | 83/915.5 |
| 3,371,569 | A * | 3/1968 | Pearson | B23D 35/005 | 83/639.5 |
| 3,756,110 | A * | 9/1973 | Von Arx | B23D 35/005 | 83/522.23 |
| 4,011,781 | A * | 3/1977 | Whistler, Jr. | B26D 7/2614 | 83/955 |
| 4,494,428 | A * | 1/1985 | Malof | B23D 35/002 | 83/699.41 |

(Continued)

FOREIGN PATENT DOCUMENTS

JP 2006-159385 A 6/2006

*Primary Examiner* — Ghassem Alie
(74) *Attorney, Agent, or Firm* — Dinsmore & Shohl LLP; Yongsok Choi, Esq.

(57) ABSTRACT

Provided is a cutting apparatus including: an upper knife; a lower knife fixed at a predetermined position; a fixing member to which the upper knife is fixed; a fixing mechanism configured to detachably fix the upper knife at a fixing position of the fixing member; and a motion mechanism configured to move the fixing member between a non-cutting position and a cutting position in the vertical direction to perform switching between a non-cutting state where a first tip of the upper knife is spaced apart in the vertical direction from a second tip of the lower knife and a cutting state where the first tip passed by the second tip, and the fixing mechanism can adjust the fixing position in a first direction that is orthogonal to the vertical direction and in which the first tip and the second tip come close to or move away from each other.

4 Claims, 10 Drawing Sheets

(56) References Cited

U.S. PATENT DOCUMENTS

| | | | | |
|---|---|---|---|---|
| 5,042,345 | A * | 8/1991 | Hawkins ................ | B23D 33/08 83/639.1 |
| 5,439,039 | A * | 8/1995 | Bradstreet, Jr. ....... | B27L 11/005 241/292.1 |
| 5,784,940 | A * | 7/1998 | Gross ....................... | B26D 1/08 83/699.41 |
| 6,155,151 | A * | 12/2000 | Reichert .............. | B26D 7/2628 83/342 |
| 8,312,801 | B2 * | 11/2012 | Sundquist, III ...... | B26D 7/2628 83/640 |
| 2006/0123969 | A1 | 6/2006 | Fujita et al. | |
| 2007/0158478 | A1 * | 7/2007 | Stager ................... | B27L 11/005 241/293 |

* cited by examiner

CUTTING APPARATUS

CROSS-REFERENCE TO RELATED APPLICATIONS

This application is based on Japanese Patent Application No. 2023-143421 filed on Sep. 5, 2023, the contents of which are incorporated herein by reference in its entirety.

BACKGROUND

1. Technical Field

The present disclosure relates to a cutting apparatus.

2. Description of Related Art

Cutting apparatuses configured to cut an edge of a fore edge of a booklet or the like are conventionally known (for example, see Japanese Patent Application Laid-Open No. 2006-159385). Japanese Patent Application Laid-Open No. 2006-159385 discloses lowering an upper knife onto a stationary lower knife and thereby cutting a fore edge of a booklet or the like positioned relative to the lower knife.

In a cutting apparatus employing a system that lowers the upper knife onto the stationary lower knife, it is required to position the upper knife relative to the lower knife so as to make the clearance between the lower knife and the upper knife narrower as much as possible in order to perform good cutting.

However, Japanese Patent Application Laid-Open No. 2006-159385 does not disclose a mechanism for adjusting the clearance between the lower knife and the upper knife. If the clearance between the lower knife and the upper knife varies in accordance with an individual difference in cutting apparatuses or the usage state of the cutting apparatus, this may prevent good cutting. Further, an attempt to adjust respective installed positions of the lower knife and the upper knife may require time for the operator to perform adjustment operation and may make the operation difficult.

For example, one conceivable method for adjusting the clearance between the lower knife and the upper knife may be to fix the lower knife illustrated in FIG. 3 of Japanese Patent Application Laid-Open No. 2006-159385 to another member by screws and move the position of the lower knife relative to the upper knife in the lateral direction in the drawing.

In the state illustrated in FIG. 3(*c*) where the tip of the upper knife has passed by the tip of the lower knife, however, a pressing plate that moves vertically in association with the upper knife moves in a direction of pushing the lower knife. Thus, in this state, it is not easy to perform operation to adjust and fix the position in the lateral direction of the lower knife by screws. Thus, for example, adjustment of the clearance between the lower knife and the upper knife would require additional operation such as detaching in advance the pressing plate that moves vertically in association with the upper knife.

BRIEF SUMMARY

The present disclosure has been made in view of such circumstances and intends to provide a cutting apparatus that can easily adjust the clearance between a first knife and a second knife to perform better cutting.

A cutting apparatus according to one aspect of the present disclosure cuts a sheet bundle and includes: a first knife; a second knife fixed at a predetermined position; a fixing member, the first knife being fixed to the fixing member; a fixing mechanism configured to detachably fix the first knife at a fixing position of the fixing member; and a motion mechanism configured to move the fixing member between a non-cutting position and a cutting position in the vertical direction to perform switching between a non-cutting state where a first tip of the first knife is spaced apart in the vertical direction from a second tip of the second knife and a cutting state where the first tip passed by the second tip, and the fixing mechanism is configured to adjust the fixing position in a first direction, the first direction being orthogonal to the vertical direction, and the first tip and the second tip coming close to or moving away from each other in the first direction.

According to the cutting apparatus of one aspect of the present disclosure, the fixing member to which the first knife is fixed is moved between the non-cutting position and the cutting position in the vertical direction by the motion mechanism, the non-cutting state where the first tip of the first knife is spaced apart in the vertical direction from the second tip of the second knife and the cutting state where the first tip has passed by the second tip are switched therebetween, and the sheet bundle is cut.

According to the cutting apparatus of one aspect of the present disclosure, the fixing position can be adjusted by the fixing mechanism in the first direction that is orthogonal to the vertical direction and in which the first tip of the first knife and the second tip of the second knife come close to or move away from each other. Thus, even when the clearance between the first knife and the second knife in the first direction varies in accordance with an individual difference in cutting apparatuses or the usage state of the cutting apparatus, it is possible to provide the cutting apparatus that can easily adjust the clearance between the first knife and the second knife to perform better cutting.

The cutting apparatus according to one aspect of the present disclosure may be configured such that the first knife has a first end face and at least one fastening hole, the first end face being formed on a first base end on the opposite side of the first tip in the vertical direction, and the fastening hole being formed in the first end face so as to extend in the vertical direction and having an internally threaded inner circumferential face, the fixing member has a second end face and at least one fitting groove, the second end face being arranged facing the first end face in the vertical direction, and the fitting groove extending in the vertical direction and opened on one end side in the first direction, and the fixing mechanism has at least one fastening bolt having an externally threaded outer circumferential face and fastened into the fastening hole and fastens the fastening bolt into the fastening hole with the first end face and the second end face being in contact with each other to fix the first knife at the fixing position of the fixing member.

According to the cutting apparatus of the present configuration, by inserting the fastening bolt into the fitting groove of the fixing member with the fastening bolt being attached into the fastening hole formed in the first end face of the first knife, it is possible to adjust the clearance between the first knife and the second knife. When the fixing member has been moved to the cutting position into the cutting state where the first tip of the first knife has passed by the second tip of the second knife, and the first knife is pushed in the first direction against the second knife, a state where no clearance is present in the first direction between the first knife and the second knife is obtained. In this state, the operator fastens the fastening bolt into the fastening hole to fix the first knife at the fixing position of the fixing member, and it is thereby possible to maintain the state where no clearance is present in the first direction between the first knife and the second knife.

The cutting apparatus of the above configuration may be formed such that the fixing member has a plurality of fitting grooves arranged with intervals in a second direction, the second direction being orthogonal to the vertical direction and the first direction, the first knife has a plurality of fastening holes arranged with intervals in the second direction, and the fixing mechanism has a plurality of fastening bolts and fastens the plurality of fastening bolts into the plurality of fastening holes with the first end face and the second end face being in contact with each other to fix the first knife at the fixing position of the fixing member.

According to the cutting apparatus of the present aspect, the first knife is fixed to the fixing member at multiple points arranged with intervals in the second direction, and it is thereby possible to suitably maintain the state where the clearance between the first knife and the second knife at each of the multiple points arranged with intervals in the second direction is made narrower as much as possible.

The cutting apparatus according to one aspect of the present disclosure may be configured to include a holding part configured to hold a state where the first end face and the second end face are in contact with each other in an unfixed state where the first knife is not fixed at the fixing position of the fixing member.

According to the cutting apparatus of the present configuration, in the unfixed state where the first knife is not fixed at the fixing position of the fixing member, a state where the first end face of the first knife and the second end face of the fixing member are in contact with each other can be held by the holding part. It is thus possible to hold a state where the clearance between the first knife and the second knife is made narrower as much as possible without involving a burden of the operator.

The cutting apparatus of the above configuration may be formed such that the holding part is a magnet arranged so as to form a part of any one of the first end face and the second end face, and the other of the first end face and the second end face is formed of a magnetic material.

According to the cutting apparatus of the present aspect, the magnet is arranged so as to form a part of any one of the first end face of the first knife and the second end face of the second knife, the magnetic material forming the other of the first end face and the second end face is attracted by magnetic force of the magnet, and this makes it possible to hold a state where the clearance between the first knife and the second knife is made narrower as much as possible.

DETAILED DESCRIPTION

Figure 1:
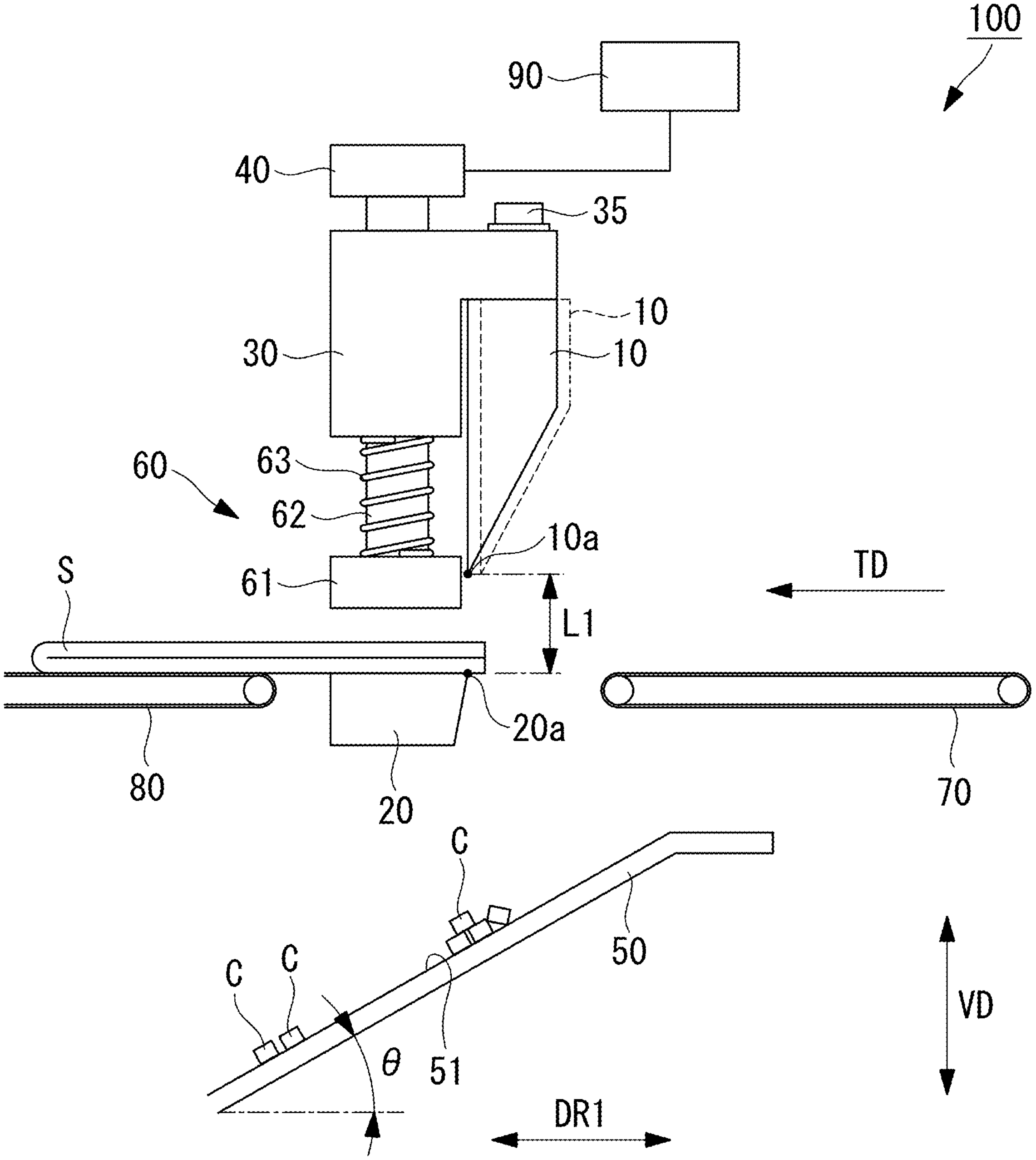
FIG. 1 is a side view illustrating a cutting apparatus according to one embodiment of the present disclosure, which illustrates a state where a fixing member is in a non-cutting position.
Figure 2:
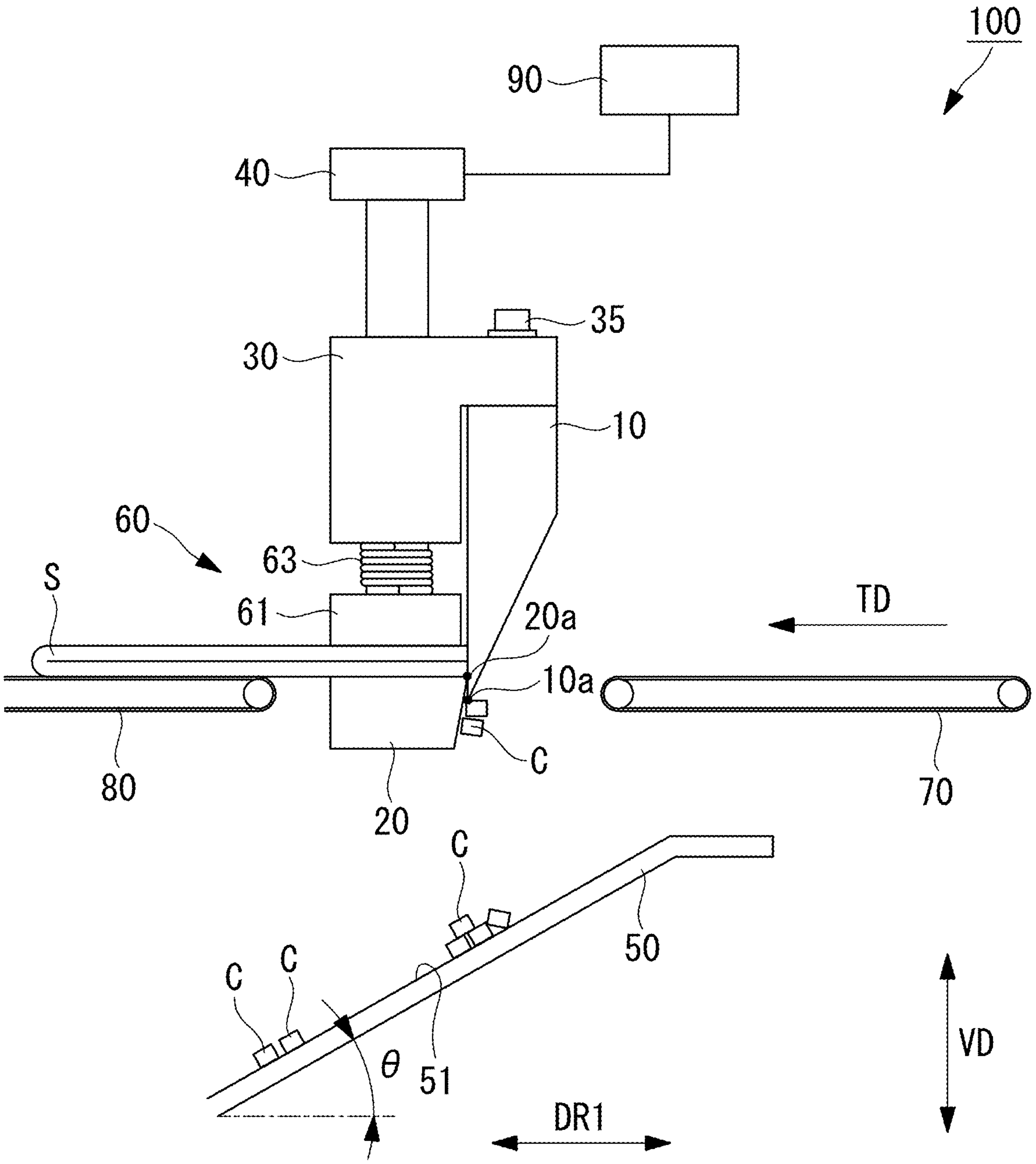
FIG. 2 is a side view illustrating the cutting apparatus according to one embodiment of the present disclosure, which illustrates a state where the fixing member is in a cutting position.

A cutting apparatus 100 according to one embodiment of the present disclosure will be described with reference to the drawings. FIG. 1 is a side view illustrating the cutting apparatus 100 according to one embodiment of the present disclosure, which illustrates a state where a fixing member 30 is in a non-cutting position. FIG. 2 is a side view illustrating the cutting apparatus 100 according to one embodiment of the present disclosure, which illustrates a state where the fixing member 30 is in a cutting position.

As illustrated in FIG. 1 and FIG. 2, the cutting apparatus 100 of the present embodiment is an apparatus configured to cut a sheet bundle S and includes an upper knife (first knife) 10, a lower knife (second knife) 20 fixed at a predetermined position in the vertical direction VD, the fixing member 30 to which the upper knife 10 is fixed, a fixing mechanism 35 that fixes the upper knife 10 to the fixing member 30, a motion mechanism 40, a collecting unit 50, a pressing unit 60, a first conveyer belt 70, a second conveyer belt 80, and a control unit 90.

The fixing mechanism 35 is a mechanism that detachably fixes the upper knife 10 at a fixing position of the fixing member 30. The fixing mechanism 35 can adjust the fixing position at which the upper knife 10 is fixed to the fixing member 30 in a first direction DR1 that is orthogonal to the vertical direction VD and in which a first tip 10*a* of the upper knife 10 and a second tip 20*a* of the lower knife 20 come close to or move away from each other. The fixing mechanism 35 can fix the upper knife 10 to the fixing member 30 at a position indicated by the solid line or a position indicated by the dotted line in FIG. 1. The detail of the fixing mechanism 35 will be described later.

The motion mechanism 40 is a mechanism that moves the fixing member 30 in the vertical direction VD between a non-cutting position (the position illustrated in FIG. 1) and a cutting position (the position illustrated in FIG. 2). When the fixing member 30 is in a non-cutting position, the state is a non-cutting state where the first tip 10*a* of the upper knife 10 is spaced away from the second tip 20*a* of the lower knife 20 by a distance L1 in the vertical direction VD. When the fixing member 30 is in a cutting position, the state is a cutting state where the first tip 10*a* of the upper knife 10 has passed by the second tip 20*a* of the lower knife 20. The motion mechanism 40 moves the fixing member 30 between the non-cutting position and the cutting position and thereby switches the state between the non-cutting state and the cutting state.

The collecting unit 50 collects chips C of the sheet bundle S cut in response to the upper knife 10 moving from the non-cutting position to the cutting position. The collecting unit 50 has a slope face 51 sloped at a slope angle θ with respect to the first direction DR1 that is the horizontal direction.

The pressing unit 60 is attached to the fixing member 30 and generates pressing force to push, against the lower knife 20, the sheet bundle S arranged on the lower knife 20 when the fixing member 30 is in the cutting position. The pressing unit 60 has a pressing member 61, a connecting member 62, and a spring 63. One end of the connecting member 62 is connected to the pressing member 61, and the other end of the connecting member 62 is accommodated in the fixing member 30. The spring 63 is a member for generating pressing force to press the pressing member 61 that is in contact with the sheet bundle S against the lower knife 20.

The first conveyer belt 70 and the second conveyer belt 80 are devices that transport the sheet bundle S in the transport direction TD. The first conveyer belt 70 and the second conveyer belt 80 operate in accordance with a transport instruction transferred from the control unit 90 to transport and then stop the sheet bundle S at a predetermined position illustrated in FIG. 1 and FIG. 2. The predetermined position illustrated in FIG. 1 and FIG. 2 is a position where the fore edge of the sheet bundle S is cut by the first tip 10*a* of the upper knife 10. The second conveyer belt 80 transports and externally discharges the sheet bundle S from which the fore edge has been cut away.

Figure 3:
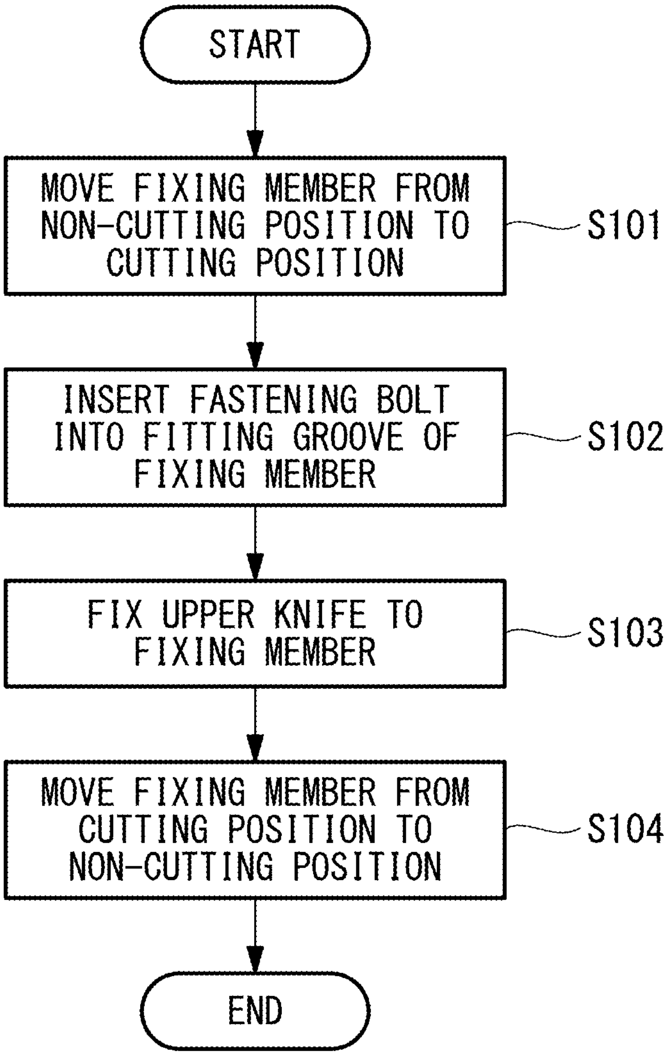
FIG. 3 is a flowchart illustrating a process to attach an upper knife to the fixing member.

Next, the process to attach the upper knife 10 to the fixing member 30 by using the fixing mechanism 35 will be described. FIG. 3 is a flowchart illustrating the process to attach the upper knife 10 to the fixing member 30. The process illustrated in FIG. 3 is started with a state where the upper knife 10 has not yet been attached to the fixing member 30.

In step S101, the control unit 90 controls the motion mechanism 40 so as to move the fixing member 30 in the vertical direction VD from the non-cutting position (the position illustrated in FIG. 1) to the cutting position (the position illustrated in FIG. 2). When the fixing member 30 has moved to the cutting position, the state illustrated in FIG. 4 and FIG. 5 is obtained.

Figure 4:
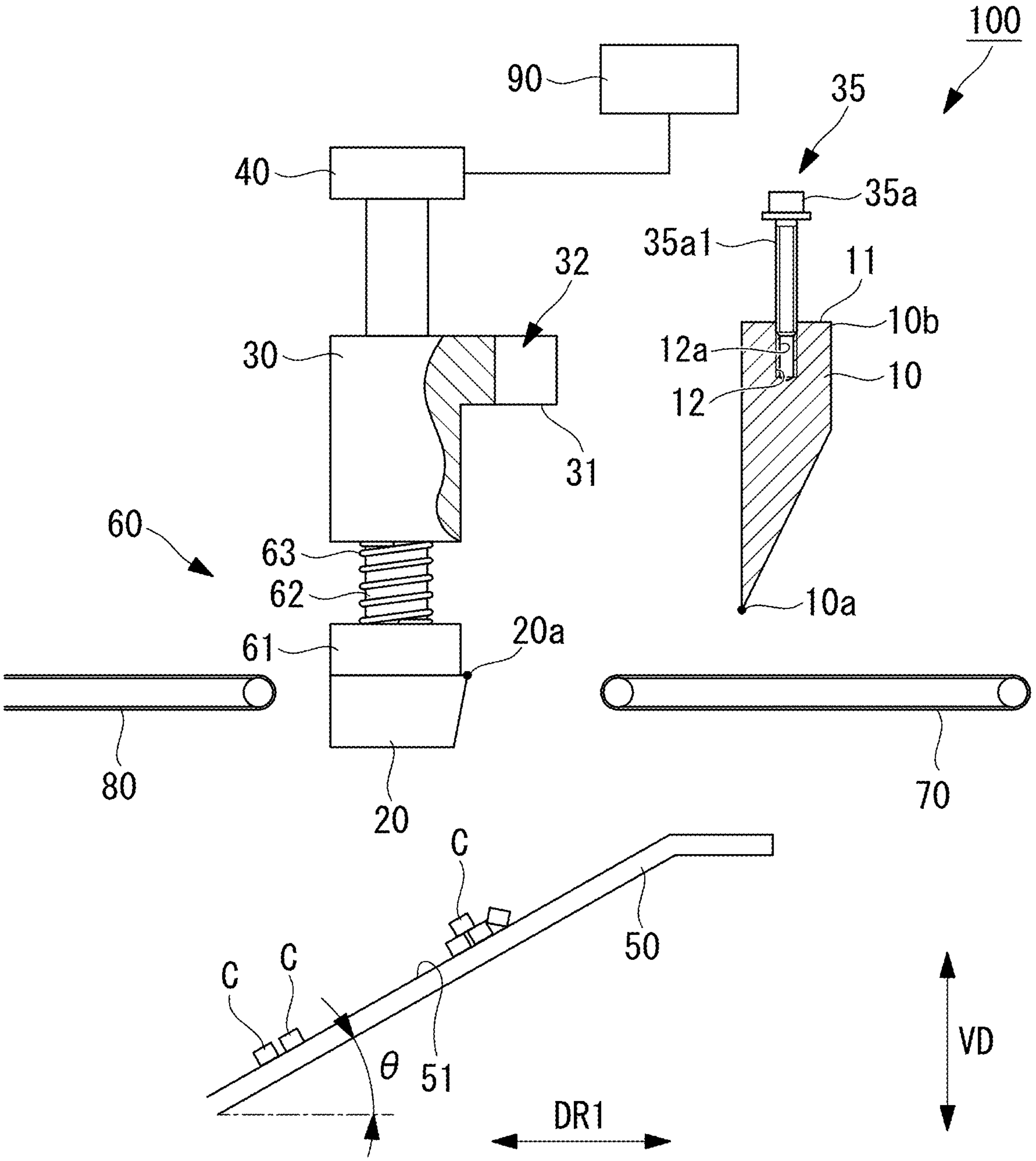
FIG. 4 is a partial sectional view of the cutting apparatus according to one embodiment of the present disclosure when viewed from the side face, which illustrates a state where the fixing member is in the cutting position and the upper knife has been detached from the fixing member.

FIG. 4 is a partial sectional view of the cutting apparatus 100 according to one embodiment of the present disclosure when viewed from the side face, which illustrates a state where the fixing member 30 is in the cutting position and the upper knife 10 has been detached from the fixing member 30. FIG. 5 is a perspective view of the fixing member 30 and the upper knife 10 of the cutting apparatus 100 illustrated in FIG. 4.

Figure 5:
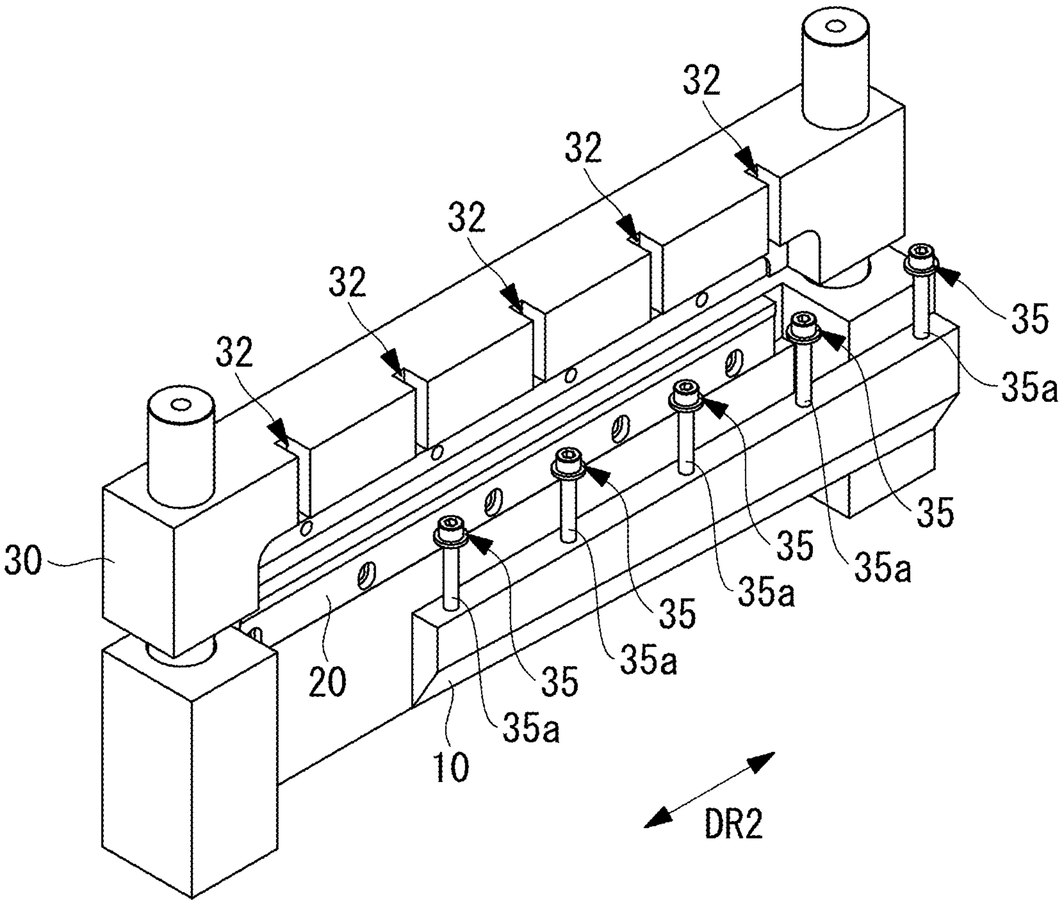
FIG. 5 is a perspective view of the fixing member and the upper knife of the cutting apparatus illustrated in FIG. 4.

As illustrated in FIG. 4 and FIG. 5, the upper knife 10 has a first end face 11 formed on a first base end 10*b* on the opposite side of the first tip 10*a* in the vertical direction VD. The first end face 11 is arranged along the first direction DR1 that is the horizontal direction. The upper knife 10 has fastening holes 12 formed in the first end face 11 so as to extend in the vertical direction VD. An internal thread 12*a* is formed in the inner circumferential face of the fastening hole 12. The upper knife 10 has a plurality of fastening holes 12 arranged with intervals in the second direction DR2 orthogonal to the vertical direction VD and the first direction DR1.

As illustrated in FIG. 4 and FIG. 5, the fixing member 30 has a second end face 31 arranged facing the first end face 11 of the upper knife 10 in the vertical direction VD and fitting grooves 32 each extending in the vertical direction VD and opened on one end side in the first direction DR1. The fixing member 30 has a plurality of fitting grooves 32 arranged with intervals in the second direction DR2.

As illustrated in FIG. 4 and FIG. 5, the fixing mechanisms 35 have a plurality of fastening bolts 35*a* each having an external thread 35*al* formed on the outer circumferential face and fastened into the internal thread 12*a* of the fastening hole 12 of the upper knife 10. In a state where the upper knife 10 has not yet been attached to the fixing member 30, a part of the external thread 35*al* of the fastening bolt 35*a* is fastened into the internal thread 12*a* of the fastening hole 12. The fixing mechanisms 35 fix the upper knife 10 at a fixing position of the fixing member 30 by fastening a plurality of fastening bolts 35*a* to a plurality of fastening holes 12 with the first end face 11 of the upper knife 10 and the second end face 31 of the fixing member 30 being in contact with each other.

Figure 6:
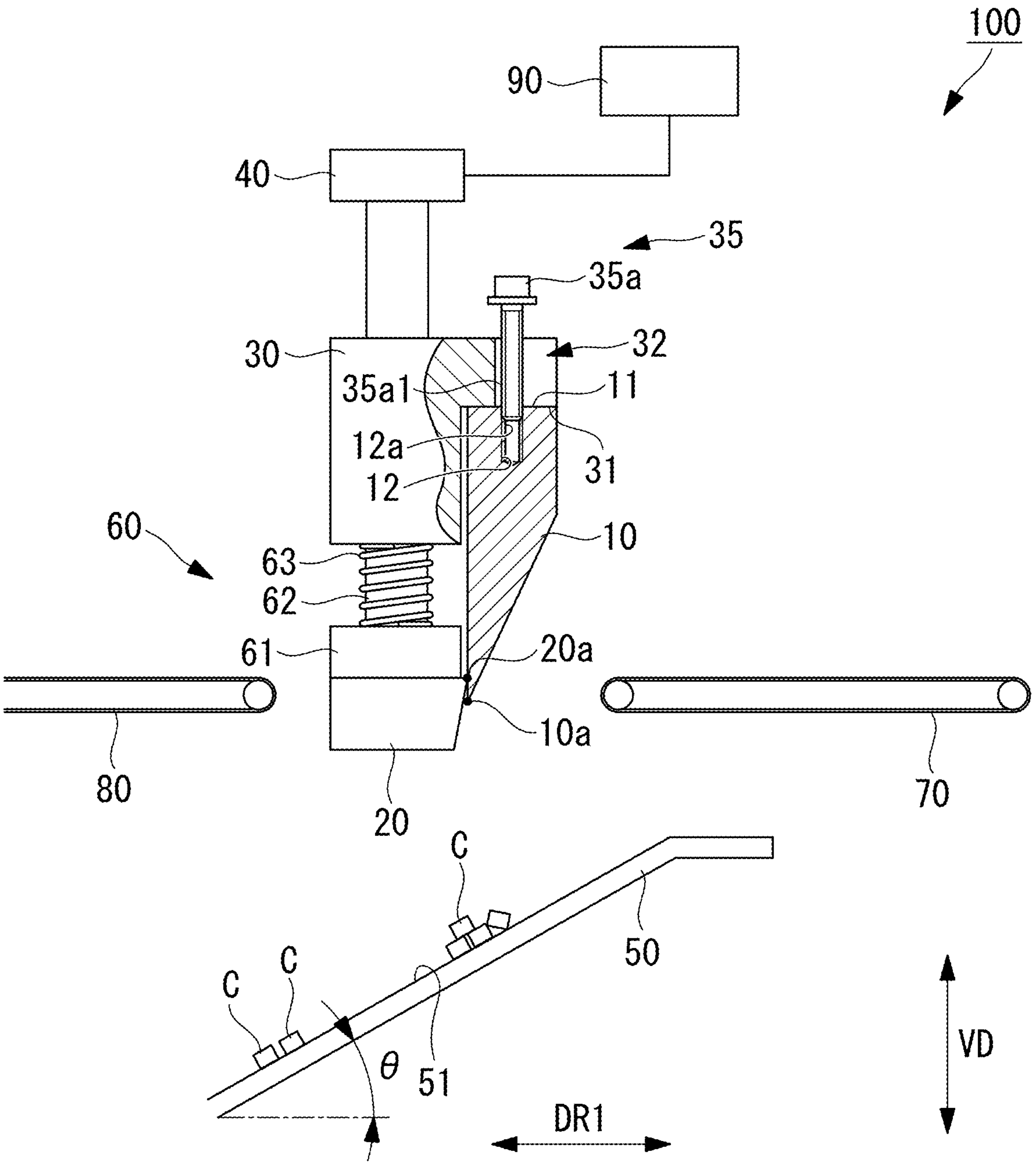
FIG. 6 is a partial sectional view of the cutting apparatus according to one embodiment of the present disclosure when viewed from the side face, which illustrates a state where the fixing member is in the cutting position and a fastening bolt has been inserted in a fitting groove of the fixing member.

In step S102, the operator inserts the fastening bolts 35*a* partially fastened into the fastening holes 12 of the upper knife 10 into the fitting grooves 32 of the fixing member 30 to obtain the state illustrated in FIG. 6. FIG. 6 is a partial sectional view of the cutting apparatus 100 according to one embodiment of the present disclosure when viewed from the side face, which illustrates a state where the fixing member 30 is in the cutting position and the fastening bolt 35*a* has been inserted in the fitting groove 32 of the fixing member 30. The operator pushes the upper knife 10 in the first direction DR1 against the lower knife 20 to obtain a state where no clearance is present in the first direction DR1 between the upper knife 10 and the lower knife 20.

In step S103, the operator rotates the fastening bolt 35*a* while maintaining the state illustrated in FIG. 6 to further fasten the external thread 35*al* into the internal thread 12*a* to obtain a state where the head of the fastening bolt 35*a* is in contact with the fixing member 30 and thereby fixes the upper knife 10 at a fixing position of the fixing member 30. The operator fastens the fastening bolt 35*a* into the fastening hole 12 to fix the upper knife 10 at a fixing position of the fixing member 30 while pushing the upper knife 10 in the first direction DR1 against the lower knife 20, and thereby the state where no clearance is present in the first direction DR1 between the upper knife 10 and the lower knife 20 is maintained.

Figure 7:
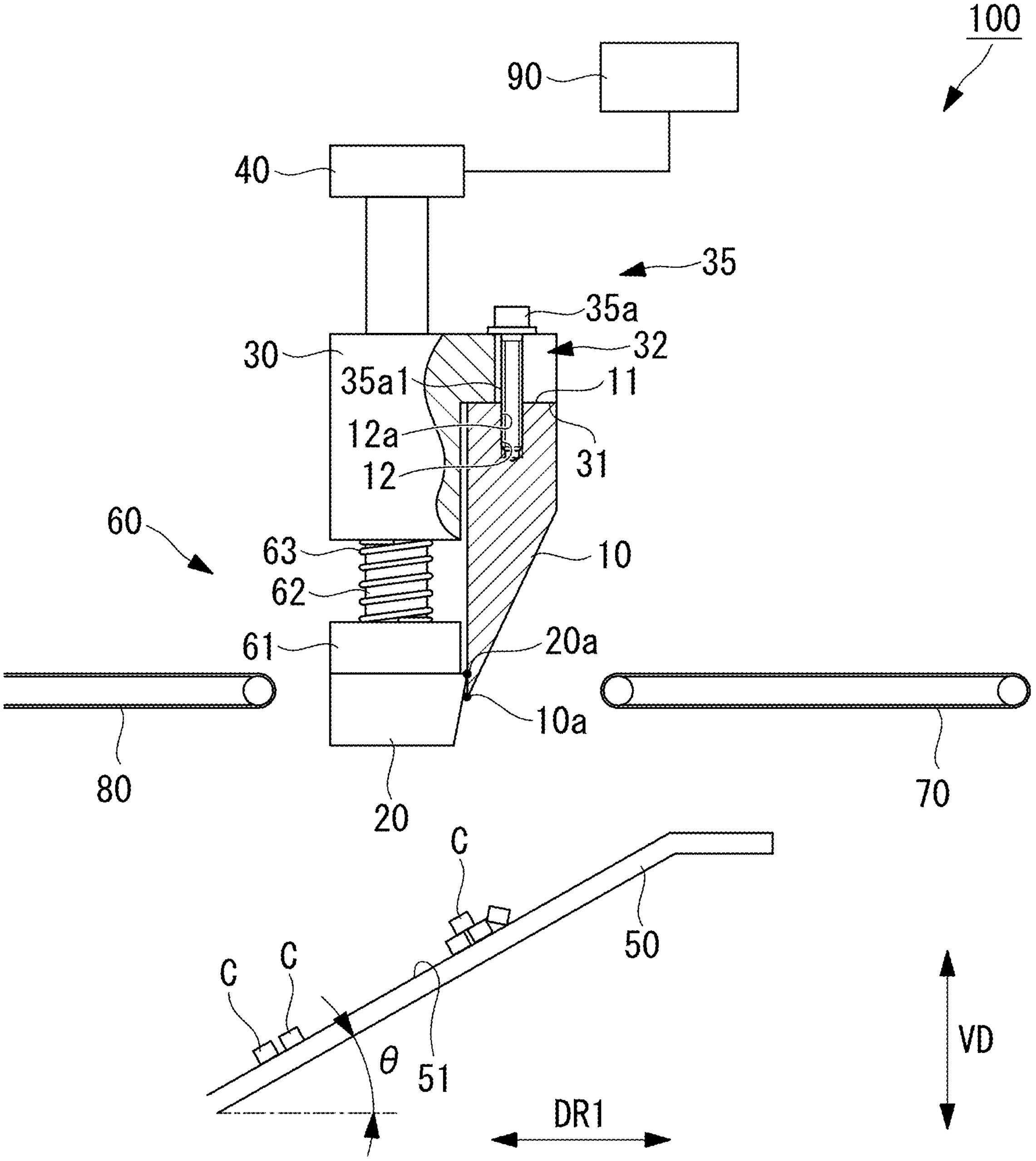
FIG. 7 is a partial sectional view illustrating the cutting apparatus according to one embodiment of the present disclosure when viewed from the side face, which illustrates a state where the fixing member is in the cutting position and the upper knife has been attached to the fixing member.
Figure 8:
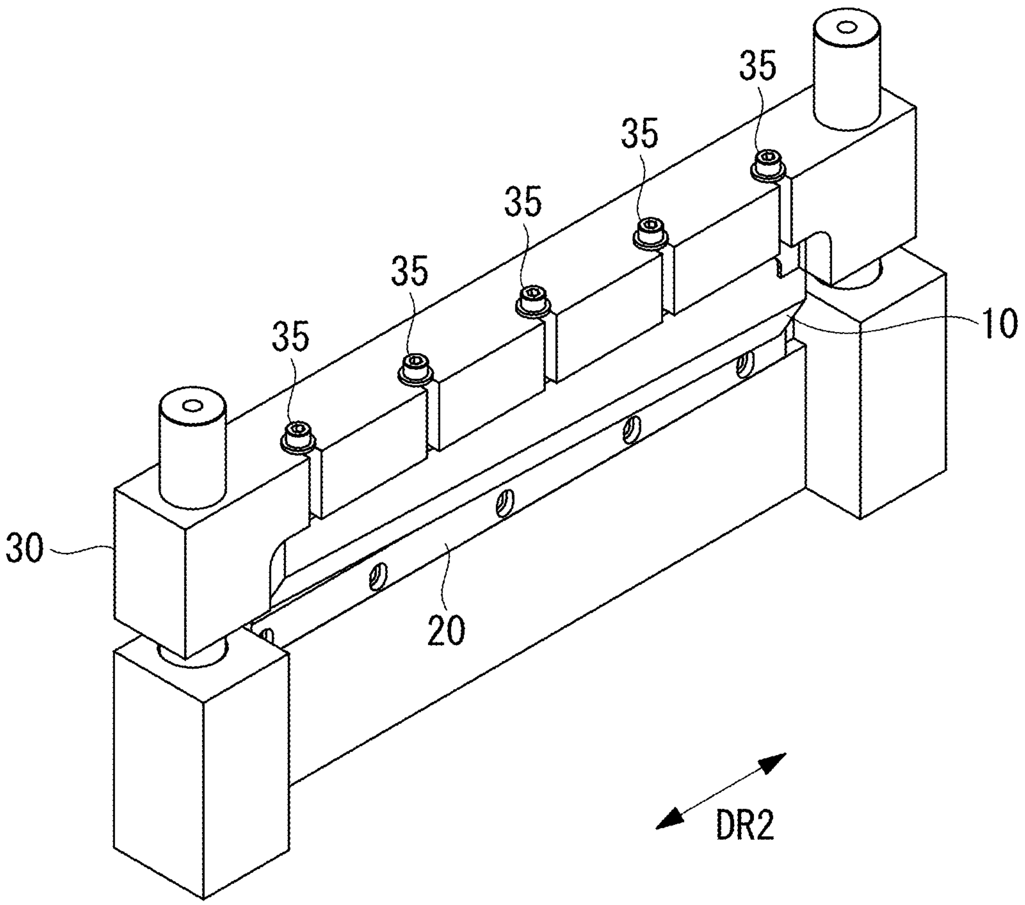
FIG. 8 is a perspective view of the cutting apparatus illustrated in FIG. 7.

When the upper knife 10 has been fixed at the fixing position of the fixing member 30, the state illustrated in FIG. 7 and FIG. 8 is obtained. FIG. 7 is a partial sectional view illustrating the cutting apparatus 100 according to one embodiment of the present disclosure when viewed from the side face, which illustrates a state where the fixing member 30 is in the cutting position and the upper knife 10 has been attached to the fixing member 30. FIG. 8 is a perspective view of the cutting apparatus 100 illustrated in FIG. 7.

In step S104, the control unit 90 controls the motion mechanism 40 to move the fixing member 30 in the vertical direction VD from the cutting position (the position illustrated in FIG. 2) to the non-cutting position (the position illustrated in FIG. 1) and ends the process of the present flowchart. When the fixing member 30 has moved to the cutting position, the state illustrated in FIG. 1 is obtained.

Figure 9:
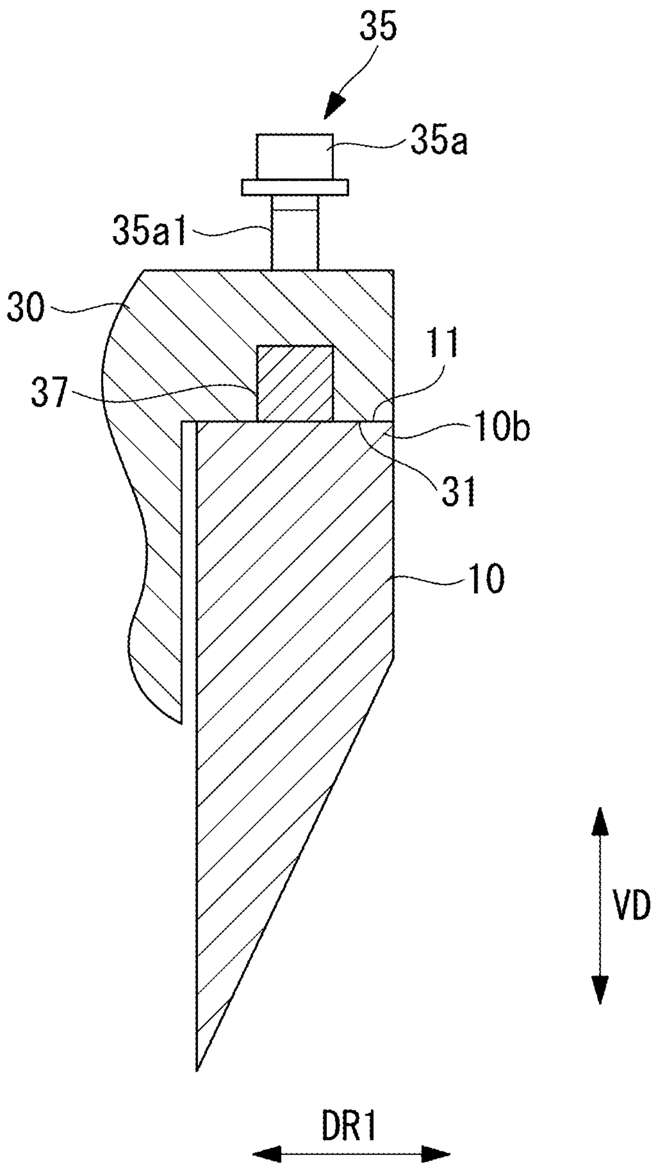
FIG. 9 is a sectional view of the fixing member and the upper knife illustrating a first modified example for the present embodiment.

Although, in step S102, the operator pushes the upper knife 10 in the first direction DR1 against the lower knife 20 to obtain the state where no clearance is present in the first direction DR1 between the upper knife 10 and the lower knife 20 and then continues to maintain the state, another form may be employed. For example, as illustrated in FIG. 9, the cutting apparatus 100 may include a magnet (holding part) 37 that holds a state where the first end face 11 and the second end face 31 are in contact with each other in an unfixed state where the upper knife 10 is not fixed at a fixing position of the fixing member 30. FIG. 9 is a sectional view of the fixing member 30 and the upper knife 10 illustrating a first modified example for the present embodiment.

The magnet 37 is a member attached to the fixing member 30 so as to form a part of the second end face 31 of the fixing member 30. The first end face 11 of the upper knife 10 is formed of a magnetic material. Thus, after the operator has pushed the upper knife 10 in the first direction DR1 against the lower knife 20 to obtain the state where no clearance is present in the first direction DR1 between the upper knife 10 and the lower knife 20, the state where no clearance is present in the first direction DR1 between the upper knife 10 and the lower knife 20 can be maintained due to the magnetic force with which the magnet 37 attracts the magnetic material even when the operator then releases the force of pushing the upper knife 10 in the first direction DR1 against the lower knife 20.

Note that, although the example illustrated in FIG. 9 is to attach the magnet 37 to the fixing member 30 so as to form a part of the second end face 31 of the fixing member 30, another form may be employed. For example, the magnet 37 may be attached to the upper knife 10 so as to form a part of the first end face 11 of the upper knife 10. In such a case, the second end face 31 of the fixing member 30 is formed of a magnetic material.

Figure 10:
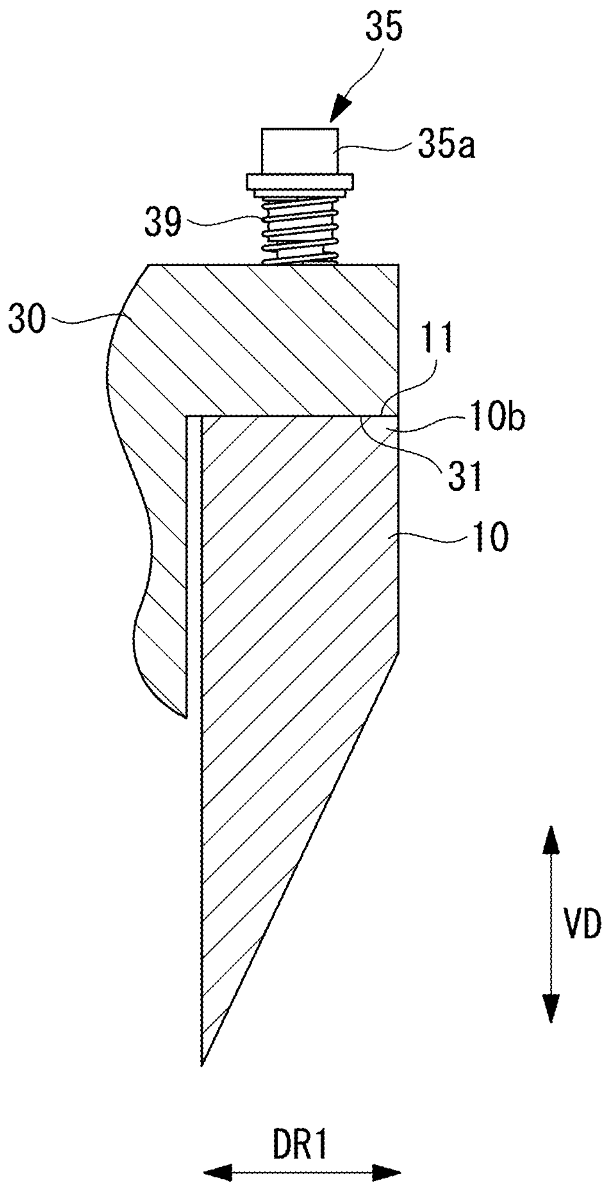
FIG. 10 is a sectional view of the fixing member and the upper knife illustrating a second modified example for the present embodiment.

Further, although, in step S102, the operator pushes the upper knife 10 in the first direction DR1 against the lower knife 20 to obtain the state where no clearance is present in the first direction DR1 between the upper knife 10 and the lower knife 20 and then continues to maintain the state, another form may be employed. For example, as illustrated in FIG. 10, the cutting apparatus 100 may include a spring (holding part) 39 that holds a state where the first end face 11 and the second end face 31 are in contact with each other in an unfixed state where the upper knife 10 is not fixed at a fixing position of the fixing member 30.

The spring 39 is a member that generates pushing force for moving the head of the fastening bolt 35*a* upward in the vertical direction VD with respect to the fixing member 30. After the operator has pushed the upper knife 10 in the first direction DR1 against the lower knife 20 to obtain a state where no clearance is present in the first direction DR1 between the upper knife 10 and the lower knife 20, the state where no clearance is present in the first direction DR1 between the upper knife 10 and the lower knife 20 can be maintained due to the pushing force of the spring 39 even when the operator then releases the force of pushing the upper knife 10 in the first direction DR1 against the lower knife 20.

Effects and advantages achieved by the cutting apparatus 100 of the present embodiment described above will be described.

According to the cutting apparatus 100 of the present embodiment, the fixing member 30 to which the upper knife 10 is fixed is moved between the non-cutting position and the cutting position in the vertical direction VD by the motion mechanism 40, the non-cutting state where the first tip 10*a* of the upper knife 10 is spaced apart in the vertical direction VD from the second tip 20*a* of the lower knife 20 and the cutting state where the first tip 10*a* has passed by the second tip 20*a* are switched therebetween, and the sheet bundle S is cut.

According to the cutting apparatus 100 of the present embodiment, the fixing position can be adjusted by the fixing mechanism 35 in the first direction DR1 that is orthogonal to the vertical direction VD and in which the first tip 10*a* of the upper knife 10 and the second tip 20*a* of the lower knife 20 come close to or move away from each other. Thus, even when the clearance between the upper knife 10 and the lower knife 20 in the first direction DR1 varies in accordance with an individual difference in cutting apparatuses 100 or the usage state of the cutting apparatus 100, it is possible to provide the cutting apparatus 100 that can easily adjust the clearance between the upper knife 10 and the lower knife 20 to perform better cutting.

According to the cutting apparatus 100 of the present embodiment, by inserting the fastening bolt 35*a* into the fitting groove 32 of the fixing member 30 with the fastening bolt 35*a* being attached into the fastening hole 12 formed in the first end face 11 of the upper knife 10, it is possible to adjust the clearance between the upper knife 10 and the lower knife 20. When the fixing member 30 has been moved to the cutting position into the cutting state where the first tip 10*a* of the upper knife 10 has passed by the second tip 20*a* of the lower knife 20, and the upper knife 10 is pushed in the first direction DR1 against the lower knife 20, a state where no clearance is present in the first direction DR1 between the upper knife 10 and the lower knife 20 is obtained. In this state, the operator fastens the fastening bolt 35*a* into the fastening hole 12 to fix the upper knife 10 at the fixing position of the fixing member 30, and it is thereby possible to maintain the state where no clearance is present in the first direction DR1 between the upper knife 10 and the lower knife 20.

According to the cutting apparatus 100 of the present embodiment, the upper knife 10 is fixed to the fixing member 30 at multiple points arranged with intervals in the second direction DR2, and it is thereby possible to suitably maintain the state where the clearance between the upper knife 10 and the lower knife 20 at each of the multiple points arranged with intervals in the second direction DR2 is made narrower as much as possible.

According to the cutting apparatus 100 of the first modified example or the second modified example for the present embodiment, in the unfixed state where the upper knife 10 is not fixed at the fixing position of the fixing member 30, a state where the first end face 11 of the upper knife 10 and the second end face 31 of the fixing member 30 are in contact with each other can be held by the magnet 37 or the spring 39. It is thus possible to hold a state where the clearance between the upper knife 10 and the lower knife 20 is made narrower as much as possible without involving a burden of the operator.

What is claimed is:

1. A cutting apparatus configured to cut a sheet bundle, the cutting apparatus comprising:

a first knife having a first end face formed on a first base end on the opposite side of a first tip in a vertical direction, and at least one fastening hole formed in the first end face so as to extend in the vertical direction and having an internally threaded inner circumferential face;

a second knife fixed at a predetermined position;

a fixing member having a second end face arranged facing the first end face in the vertical direction, and at least one fitting groove extending in the vertical direction and opened on one end side in a first direction;

a fixing mechanism having at least one fastening bolt having an externally threaded outer circumferential face, the fixing mechanism being configured to detachably fix the first knife at a fixing position of the fixing member by fastening the fastening bolt into the fastening hole with the first end face and the second end face being in contact with each other; and a motion mechanism configured to move the fixing member between a non-cutting position and a cutting position in a vertical direction to perform switching between a non-cutting state where a first tip of the first knife is spaced apart in the vertical direction from a second tip of the second knife and a cutting state where the first tip passed has passed by the second tip, wherein the first direction is orthogonal to the vertical direction and is a direction in which the first tip and the second tip come close to or move away from each other, and wherein the fixing mechanism is configured to adjust the fixing position in the first direction by sliding the fastening bolt within the fitting groove.

2. The cutting apparatus according to claim 1, wherein the fixing member has a plurality of fitting grooves arranged with intervals in a second direction, the second direction being orthogonal to the vertical direction and the first direction, wherein the first knife has a plurality of fastening holes arranged with intervals in the second direction, and wherein the fixing mechanism has a plurality of fastening bolts and fastens the plurality of fastening bolts into the plurality of fastening holes with the first end face and the second end face being in contact with each other to fix the first knife at the fixing position of the fixing member.

3. The cutting apparatus according to claim 2 further comprising a holding part configured to hold a state where the first end face and the second end face are in contact with each other in an unfixed state where the first knife is not fixed at the fixing position of the fixing member.

4. The cutting apparatus according to claim 3, wherein the holding part is a magnet arranged so as to form a part of one of the first end face and the second end face, and wherein the other one of the first end face and the second end face is formed of a magnetic material.

* * * * *